United States Patent
Roka (10) Patent No.: US 8,943,520 B1
(45) Date of Patent: Jan. 27, 2015

(54) UNIFORM RESOURCE LOCATOR APPLICATION INITIATION

(75) Inventor: Pujan K. Roka, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1260 days.

(21) Appl. No.: 11/946,132

(22) Filed: Nov. 28, 2007

(51) Int. Cl.
*G06F 3/00* (2006.01)

(52) U.S. Cl.
USPC .......................................... 719/320

(58) Field of Classification Search
None
See application file for complete search history.

(56) References Cited

U.S. PATENT DOCUMENTS

| | | | |
|---|---|---|---|
| 7,079,839 B1 * | 7/2006 | Papineau | 455/418 |
| 2002/0032589 A1 * | 3/2002 | Shah | 705/6 |
| 2003/0065738 A1 * | 4/2003 | Yang et al. | 709/215 |
| 2003/0084138 A1 * | 5/2003 | Tavis et al. | 709/223 |
| 2003/0135548 A1 * | 7/2003 | Bushkin | 709/203 |
| 2005/0250548 A1 * | 11/2005 | White | 455/566 |
| 2007/0150550 A1 * | 6/2007 | Lin et al. | 709/217 |

FOREIGN PATENT DOCUMENTS

WO WO 01/22680 A2 * 3/2001

OTHER PUBLICATIONS

Topley, Kim, J2ME in a Nutshell, Mar. 2002, O'Reilly, p. 47-83 pages.*

* cited by examiner

*Primary Examiner* — H S Sough
*Assistant Examiner* — Carina Yun (57) ABSTRACT

Computer-readable media, systems, and methods for initializing a destination application on a mobile device based upon a received uniform resource locator ("URL") request that is associated with the destination application. In embodiments, a URL request is received from a background application on a mobile device and the URL request indicates an address of a website that the user requests the mobile device be redirected to. Further, in embodiments, the URL request is parsed to obtain an application identification portion that is at least part of the URL request. In embodiments, it is determined that there is an association between the application identification portion and the destination application where the destination application is registered on the mobile device and is associated with the application identification portion of the URL request. Still further, in embodiments, the destination application is initialized.

11 Claims, 5 Drawing Sheets

FIG. 7

UNIFORM RESOURCE LOCATOR APPLICATION INITIATION

CROSS-REFERENCE TO RELATED APPLICATIONS

Not applicable.

BRIEF SUMMARY

The present invention is defined by the claims below. Embodiments of the present invention solve at least the problems described herein by providing computer-readable media, systems, and methods for initializing a destination application on a mobile device based upon a received uniform resource locator ("URL") request that is associated with the destination application. Embodiments of the present invention, as described herein, have several practical applications in the technical arts including, without limitation, receiving a URL request from a background application on a mobile device, parsing the URL request to obtain an application identification portion, determining that there is an association between the application identification portion and the destination application, and initializing the destination application.

It should be noted that this Summary is provided to generally introduce the reader to one or more select concepts described below in the Detailed Description in a simplified form. The Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of the individual steps is explicitly described.

Embodiments of the present invention provide systems, methods, and computer-readable media for initializing a destination application on a mobile device based upon a received URL request that is associated with the destination application. The destination application initialization allows a user to directly access a destination application on a mobile device by entering or linking to a URL that implicates a destination application for the mobile device.

Acronyms and Shorthand Notations

Throughout the description of the present invention, several acronyms and shorthand notations are used to aid in the understanding of certain concepts pertaining to the associated systems and services. These acronyms and shorthand notations are solely intended for the purpose of providing an easy methodology of communicating the ideas expressed herein and are in no way meant to limit the scope of the present invention. The following is a list of these acronyms:

BSC Base Station Controller
BTS Base Transceiver System
MSC Mobile Switching Center
SMS Short Message Service
URL Uniform Resource Locator
WAP Wireless Application Protocol Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited references.

As one skilled in the art will appreciate, embodiments of the present invention may be embodied as, among other things, a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media may comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Uniform Resource Locator Application Initiation

In various embodiments of the present invention, URL application initialization may be used in connection with a mobile device. For instance, when a user of a mobile device enters a URL into a WAP browser on the user's mobile device, the WAP will traditionally direct to the website associated with the URL. Because the user is on a mobile device, however, instances may occur where it would be more appropriate for the mobile device to open a destination application other than the WAP browser because the display of the page on the WAP browser may not be as relevant to the user as an initialized application. For instance, where a user of a mobile device enters the URL "www.sprint.com/tv" into the WAP browser, the user intends to launch Sprint's TV application. Instead of launching a mobile device version of the application, however, traditional mobile devices will merely display mobile device version of the website on the WAP browser. Then, to launch the TV application, the user will be forced to take further steps from the displayed website. Instead, using embodiments of the present invention, where the user enters a URL that has been associated with a specific application (such as Sprint TV), the application will automatically initialize, taking the user directly to the relevant application without displaying irrelevant website information on the WAP browser of the mobile device.

Accordingly, in one aspect, the present invention is directed to one or more computer-readable media having computer-executable instructions embodied thereon that, when executed, perform a method for initializing a destination application on a mobile device based upon a received URL request that is associated with the destination application. The method includes receiving a URL request from a background application on the mobile device. The URL request indicates an address of a website to which of user of the mobile device requests the mobile device be redirected. The method further includes parsing the URL request to obtain an application identification portion that is at least a part of the URL request and determining that there is an association between the application identification portion and the destination application. Still further, the method includes initializing the destination application.

In another aspect, the present invention is directed to one or more computer-readable media having computer-executable instructions embodied thereon that, when executed, perform a method for initializing an uninstalled destination application on a mobile device upon receiving a URL request that is associated with the destination application. The method includes receiving a URL request from a background application on the mobile device. The URL request indicates an address of a website to which a user of the mobile device requests the mobile device redirect. The method further includes parsing the URL request to obtain an application identification portion that is at least a part of the URL request and determining that there is an association between the application identification portion and the destination application. Still further, the method includes determining that the destination application is uninstalled on the mobile device and redirecting the mobile device to an application download website that allows the user of the mobile device to download the destination application.

In yet another aspect, the present invention is directed to one or more computer-readable media having computer-executable instructions embodied thereon that, when executed, perform a method for dynamically updating an association table that associates one or more destination applications for a mobile device to one or more URL requests. The method includes receiving a registration request for a destination application. The destination application is unregistered on the mobile device and the registration request includes one or more associations between the destination application and an application identification portion of one or more URL requests. The method further includes updating the association table to include the one or more associations between the destination application and the application identification portion of the one or more URL requests. The association table is used to initialize the destination application on the mobile device upon receipt by the mobile device from a background application of one of the one or more URL requests associated with the destination application.

Having briefly described an overview of embodiments of the present invention, an exemplary operating environment is described below.

Figure 1:
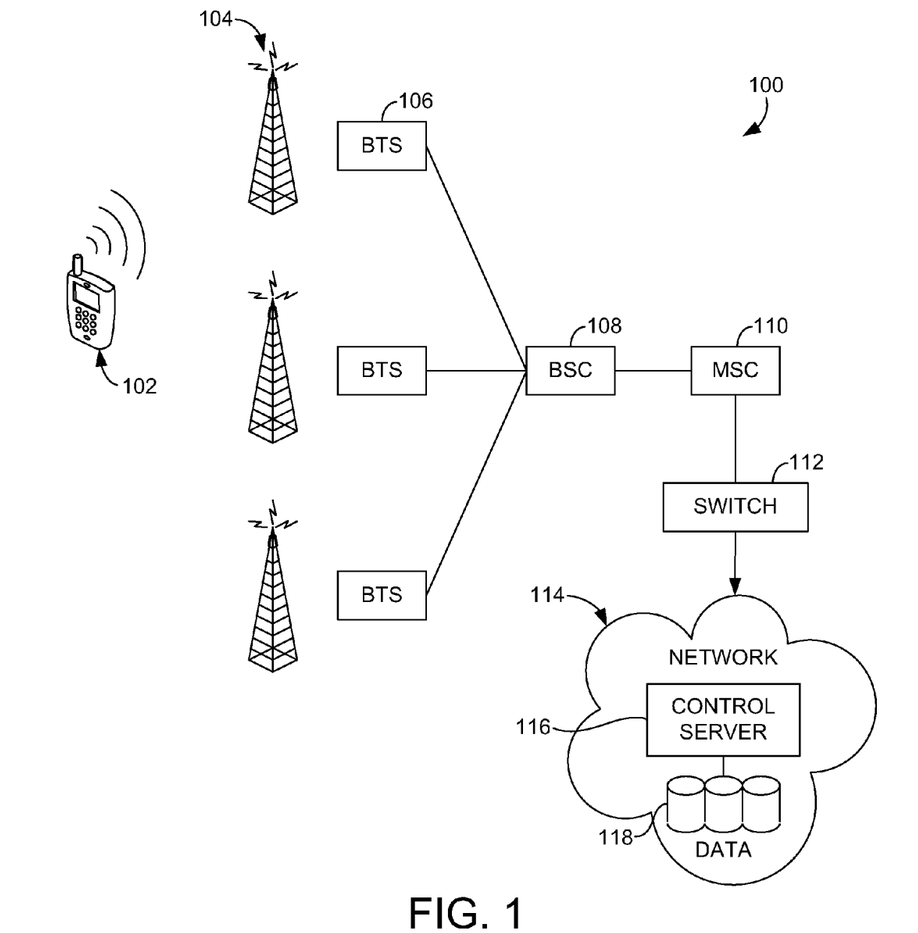
FIG. 1 is a schematic view of an exemplary wireless communications environment suitable for use in implementing embodiments of the present invention.

With reference to FIG. 1, an exemplary wireless telecommunications network environment is depicted. In the environment 100, a user's cellular or mobile phone 102 communicates over established radio frequencies through a cell tower 104 having a base transceiver system ("BTS") 106, a number of which are typically connected to a base station controller ("BSC") 108. The BSC 108 manages the communication between a number of BTSs 106 and a limited number of mobile phones 102 compatible with the wireless network 100. The BSC 108 connects to a mobile switching center ("MSC") 110 acting as a telephone exchange to handle the mobile phone activity through the associated one or more BSCs 108 while connecting as needed through a telecommunications switch 112 to the public switched telephone network 114 or other data network. The telephone network 114 includes a number of control servers 116 that manage the flow of data signals through the network 114 and connect as needed to a number of databases 118 that include information such as registrations of mobile phones 102 and associated accounts, other airtime credit information such as pin codes and associated account values, and other information.

Before engaging in a more detailed discussion of embodiments of the present invention, exemplary embodiments will be discussed to provide a context for the invention. As previously discussed, in typical mobile device Internet usage, when the mobile device receives a URL request, the device will redirect a WAP browser to display a website. Because there are online applications specific to mobile devices, however, there are various circumstances in which it would be more appropriate to handle a mobile device URL request differently than a URL request on a personal computer or some other non-mobile computing device. For instance, where a user is accessing "www.sprint.com/tv" from a personal computer, the user is presumably seeking information about Sprint TV, but is not necessarily attempting to access Sprint TV. When the user is on a mobile device, however, and a URL request is received for "www.sprint.com/tv," the user is presumably attempting to access the Sprint TV application on the mobile device. Thus, in embodiments, the present invention includes associations between various URL requests and various destination applications (in this example, the destination application is Sprint TV). In this example, the URL request "www.sprint.com/tv" would be associated with the mobile device application Sprint TV on the mobile device, so that any time a user submitted the URL request, the Sprint TV application would initialize. Also, in embodiments, the URL request may include subdirectories that are associated with particular features in a destination application. For instance, the user may enter "www.sprint.com/tv/sports" into the mobile device. The mobile device may recognize an association between the URL request and Sprint TV. Still further, however, in embodiments, the mobile device may recognize that the user is specifically requesting the sports aspect of Sprint TV and, thus, the mobile device may initialize the sports page of Sprint TV that has been associated with the URL request, taking the user directly to the most relevant information and application.

By way of another example, an airline website may have a specific mobile device application (such as a java application) for online check-in. When a user accesses the website, such as "www.airline.com," from a mobile device, instead of presenting the typical website information via the WAP browser, the online check-in application may initialize because the user is presumably attempting to check-in (there may be many other features associated with the airline's application such as transfer to another flight, seat changes, check flight status, purchase another flight, etc.). In this example, the URL request "www.airline.com" would be associated with the airline's mobile device application on the mobile device, so that any time the URL request "www.airline.com" is submitted, the airline's application would initialize. Thus, the URL application initializations allows the user of a mobile device to obtain the most relevant information and application upon entering or selecting a URL request.

As will be understood and appreciated by those having ordinary skill in the art, in embodiments of the present invention, the URL request is received from a background application. The background application may include, but is not limited to, a WAP browser (the user enters the URL request into the address bar or the user selects a link), an SMS message (the user selects a link in an SMS message), or any other mobile device application that would allow the user to enter or select a URL request. In some examples, the associated destination application may not be installed on the user's mobile device. In those instances, embodiments of the present invention will redirect the user to a website where the user will be able to download the associated destination application and, once the application has been downloaded, the mobile device may initialize the application. For instance, assuming the user is attempting online check-in for a flight for the first time and has not yet installed the airline's application on the user's mobile device. The mobile device may recognize that "www.airline.com" is associated with the airline's application and the mobile device may also recognize that the airline's application has not yet been installed. In those instances, the mobile device may also have a download location associated with the application and the mobile device may redirect the user to a website or other application where the user may download the airline's application. Also, the mobile device may, upon downloading the airline's application, initialize the application allowing the user to access online check-in functionality.

In yet another example, the associations between URL requests and destination applications may be contained in an association table and the association table may be dynamically configurable. For instance, assuming the user of a mobile device does not already have an installed destination application such as Sprint TV. In embodiments, when the user downloads or otherwise installs the Sprint TV application, the association table (which before did not have any associations for Sprint TV) may add associations for the newly installed application. In this example, the Sprint TV application may be associated in the association table with one or more URL requests (e.g. "www.sprint.com/tv" and "www.sprint.com/tv/main"). Also, as previously discussed, specific aspects of Sprint TV may be associated with specific URL requests. Thus, Sprint TV Sports may be associated with "www.sprint.com/tv/sports." Those having ordinary skill in the art will understand and appreciate that embodiments of the present application include a dynamically configurable association table that not only provides URL application initiation, but also allows new applications to be associated with one or more URL requests, creating a dynamic environment designed to provide the user with the most relevant information where the user submits a URL request to a mobile device.

Having provided an overview discussion of various exemplary embodiments of the present invention for contextual purposes, embodiments of the present invention will now be discussed in more detail with reference to the various figures to provide a more detailed understanding of the URL application initiation functionality.

Figure 2:
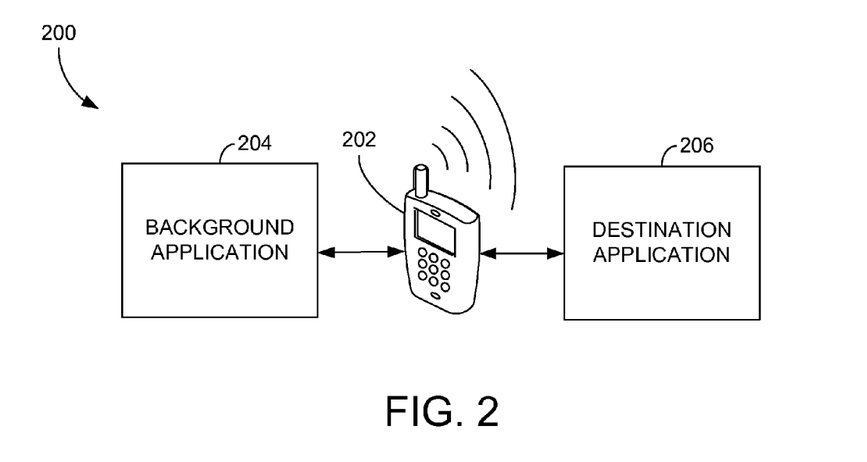
FIG. 2 is a block diagram illustrating an exemplary system for URL application initialization, in accordance with an embodiment of the present invention.

Turning now to FIG. 2, a block diagram of an exemplary system for URL application initialization, in accordance with an embodiment of the present invention, is illustrated and designated generally as reference numeral 200. System 200 includes a mobile device 202, a background application 204, and a destination application 206. As previously discussed, mobile device 202 may receive a URL request from a user through background application 204. In various embodiments, background application 204 may include a WAP browser, an SMS message, or any other application that would allow a user to either enter or select a URL request. Thus, in various embodiments, although illustrated as separate from the mobile device 202 for illustrative purposes, background application 204 may be functioning on mobile device 202. Similarly, destination application 206 is illustrated as separate from mobile device 202 and background application 204. But, in various embodiments, destination application 206 may be operating on mobile device 202. As previously discussed, embodiments of the present invention present a user of a mobile device with the most relevant application by associating various URL requests with destination applications on the mobile device, such as mobile device 202.

Figure 3:
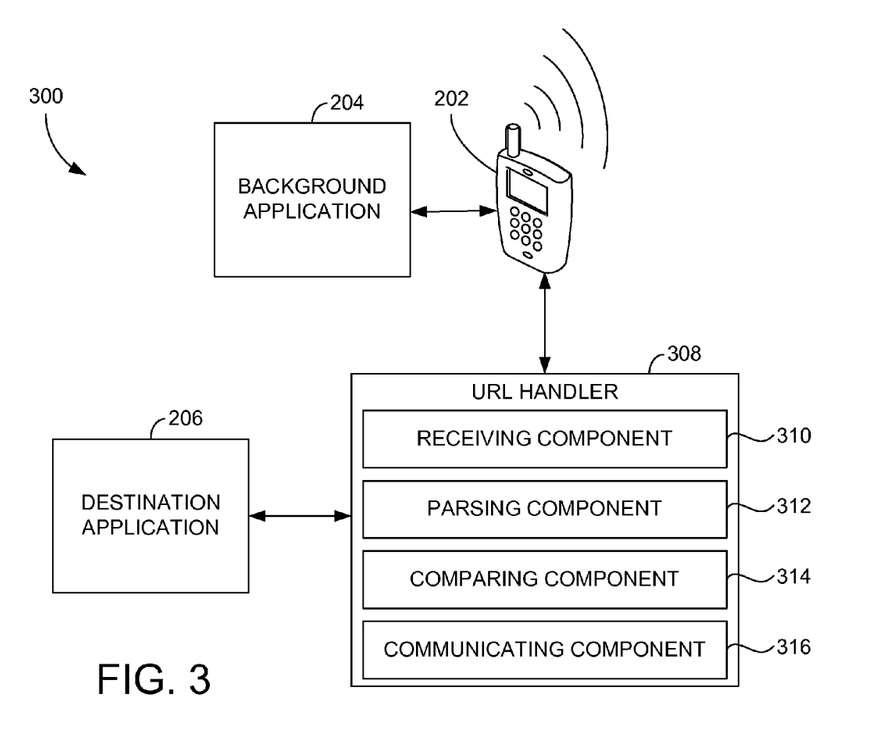
FIG. 3 is a block diagram illustrating an exemplary system for URL application initialization, the system having more detail than the system of FIG. 2, in accordance with an embodiment of the present invention.

Turning now to FIG. 3, a block diagram of an exemplary system for URL application initialization, the system having more detail than the system of FIG. 2, in accordance with an embodiment of the present invention, is illustrated and designated generally as reference numeral 300. System 300 includes, like system 200 of FIG. 2, mobile device 202, background application 204, and destination application 206. Additionally, system 300 includes URL handler 308. As previously discussed with reference to FIG. 2, although components of system 300 are shown to be separate from mobile device 202, in various embodiments the components reside on mobile device 202. Thus, in embodiments, URL handler 308 resides on mobile device 202. In various other embodiments, however, URL handler 308 may be apart from mobile device 202 and mobile device 202 may communicate with URL handler 308 through a network. Each of these configurations is contemplated and within the scope of the present invention.

URL handler 308 includes a receiving component 310, a parsing component 312, a comparing component 314, and a communicating component 316. Receiving component 310 is configured to receive one or more URL requests from a background application. For example, in various embodiments, receiving component 310 of URL handler 308 will receive a URL request from a WAP browser. In embodiments, the user entered or selected the URL request to redirect mobile device 202 to the website associated with the address in the URL request. For example, the user may enter "www.sprint.com/tv" into the WAP browser. Parsing component 312 is configured to parse the URL request to obtain an application identification portion that is at least a part of the URL request. For instance, using the "www.sprint.com/tv" URL request example, parsing component 312 may be configured to obtain the "/tv" portion of the URL request. Thus, in the example here, "/tv" is the application identification portion. In other embodiments, however, the application identification portion may include a subdirectory associated with a specific feature of the destination application. For instance, the URL request may be "www.sprint.com/tv/sports." In this example, the application identification portion obtained by parsing component 312 may be "/tv/sports" and the application identification portion may be associated with a Sprint TV Sports Page. Still further, in other embodiments, the application identification portion may include the entire URL request. For instance, where the URL request is "www.airline.com," parsing component 312 may recognize that the entire URL request is associated with the airline's application. Thus, the application identification portion may be "www.airline.com." Those having ordinary skill in the art will understand and appreciate that various information from the URL request may be used as the application identification portion and that embodiments of the present invention are not limited to any particular style and/or structure of application identification portions, as long as the application identification portion is at least a part of the URL request.

Comparing component 314 is configured to determine that the application identification portion is associated with a destination application. In various embodiments, the determination may be based upon an association table. For instance, URL handler 308 may include, or may have access to, an association table listing one or more application identification portions for various URL requests and one or more destination applications associated with those application identification portions. Communicating component 316 is configured to redirect mobile device 202 to the destination application where the URL request is associated with a destination application. For instance, where the URL request is "www.sprint.com/tv," communicating component 316 will redirect mobile device 202 to Sprint TV. As will be understood and appreciated by those having skill in the art, there may be instances in which the URL request is not associated with any particular destination application. In those instances, communicating component 316 will handle the URL request as it typically would, and the WAP browser of mobile device 202 will be redirected to the address of the URL request. Thus, in those instances, there is no associated destination application that would be more relevant than the typical WAP website information and, therefore, mobile device 202 is redirected to the website.

Figure 4:
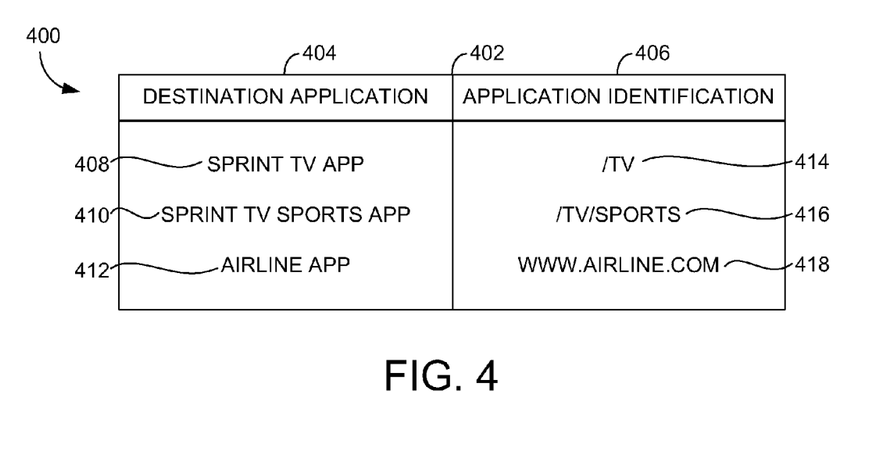
FIG. 4 is an exemplary association table for use in URL application initialization, in accordance with an embodiment of the present invention.

Turning now to FIG. 4, an exemplary association table for use in URL application initialization, in accordance with an embodiment of the present invention, is illustrated and designated generally as reference numeral 400. In this exemplary association table 402, there is a destination application column 404 and an application identification column 406. As illustrated here, and as previously discussed above, destination applications may include a Sprint TV application 408, a Sprint TV application specific feature 410, and an airline's application 412. These applications are associated with the application identification portions 414, 416, and 418. As will be understood and appreciated by those having ordinary skill in the art, many exemplary embodiments discussed herein involve a Sprint TV applications and an airline application. These embodiments are merely intended to illustrate the various destination applications that embodiments of the present invention may be used to present to the user of a mobile device. These exemplary applications are not intended to limit the scope of destination applications to those applications listed herein. Instead, it is contemplated and within the scope of the present invention that embodiments of the present invention may include various destination applications of various mobile devices.

Figure 5:
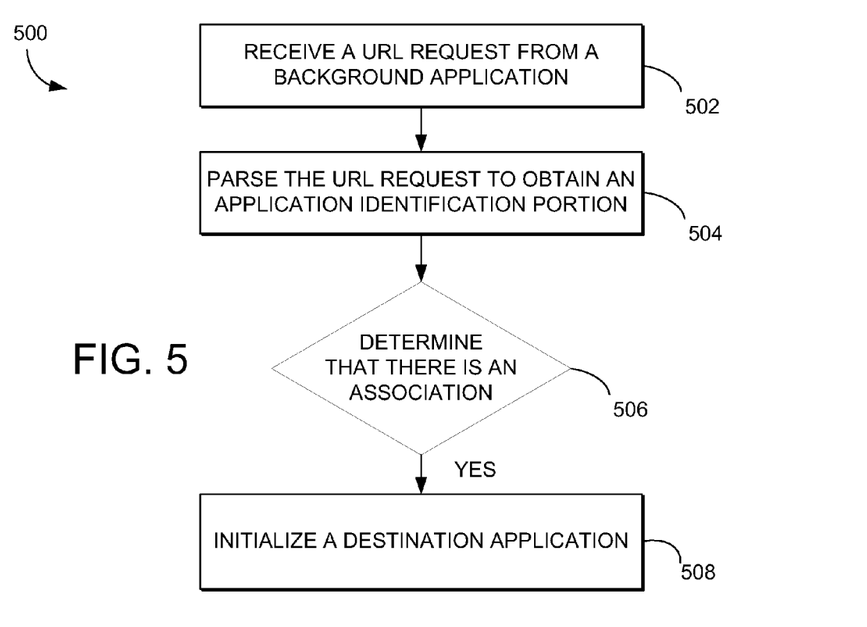
FIG. 5 is a flow diagram illustrating an exemplary method for URL application initialization, in accordance with an embodiment of the present invention.

Turning now to FIG. 5, a flow diagram of an exemplary method for URL application initialization, in accordance with an embodiment of the present invention, is illustrated and designated generally as reference numeral 500. Initially, as indicated at block 502, a URL request is received from a background application. In embodiments, the URL request indicates an address of a website to which a user of a mobile device requests the mobile device redirect. Next, as indicated at block 504, the URL request is parsed to obtain an application identification portion. As previously discussed, embodiments of the present invention are not limited to any particular application identification portion, but in embodiments, the application identification portion is at least a part of the URL request. Next, as indicated at block 506, it is determined that there is an association between the application identification portion and a destination application. For instance, the URL handler, such as URL handler 308 of FIG. 3, may determine using an association table, such as association table 402 of FIG. 4, that the URL request "www.sprint.com/tv" is associated with a Sprint TV application. Next, as indicated at block 508, the destination application is initialized.

Figure 6:
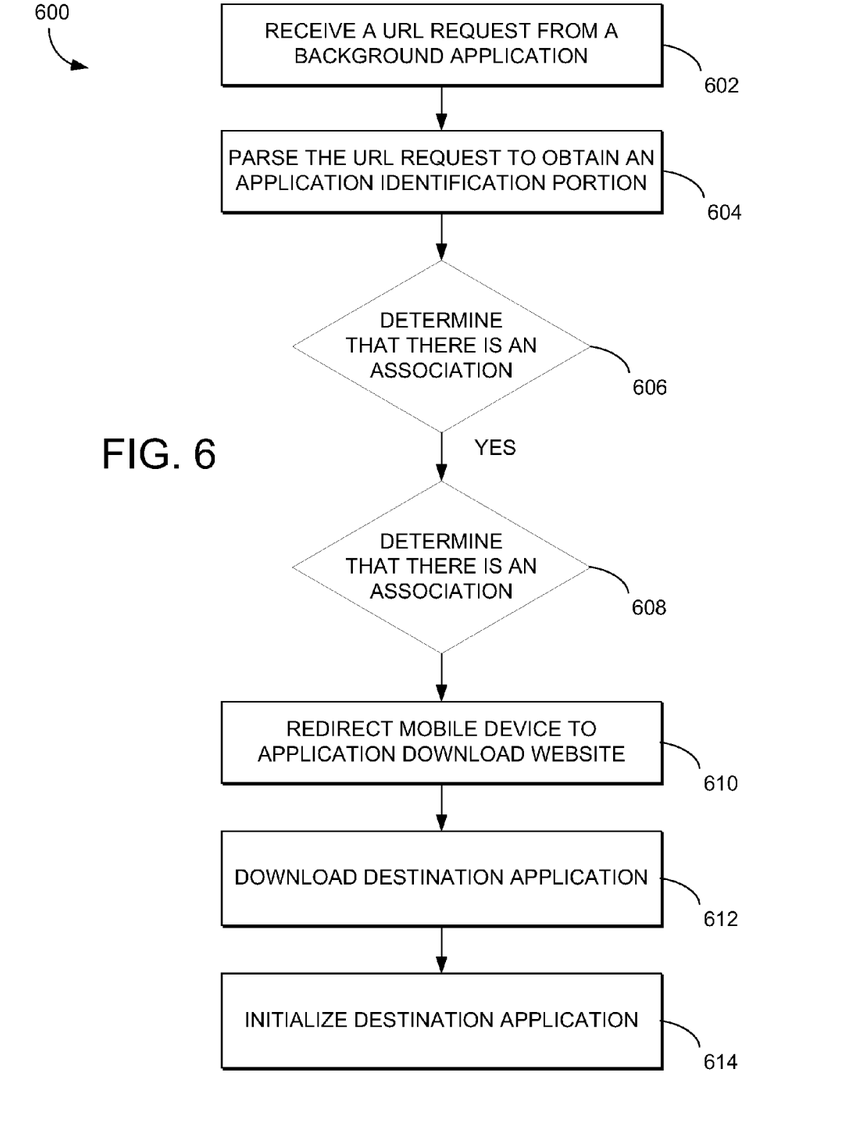
FIG. 6 is a flow diagram illustrating an exemplary method for URL application initialization, the exemplary method illustrating initialization of an uninstalled destination application, in accordance with an embodiment of the present invention.

Turning now to FIG. 6, a flow diagram of an exemplary method for URL application initialization, the exemplary method illustrating initialization of an uninstalled destination application, in accordance with an embodiment of the present invention, is illustrated and designated generally as reference numeral 600. Initially, as indicated at blocks 602, 604, and 606, a URL request is received, parsed, and it is determined that the URL request is associated with a destination application, as previously discussed with reference to FIG. 5. Next, at block 608, it is determined that the destination application is uninstalled on the mobile device. If it were not determined that the destination application is uninstalled, the method here would be similar to the method of FIG. 5. But, here the destination application is uninstalled and, thus, as indicated at block 610, the mobile device is redirected to a website that allows the user of the mobile device to download the destination application. For instance, using the Sprint TV example, the mobile device would be redirected to a website using the WAP browser that would present the user with an opportunity to download the Sprint TV application. Thus, at block 612, the destination application is downloaded and, at block 614, the destination application is initialized.

Figure 7:
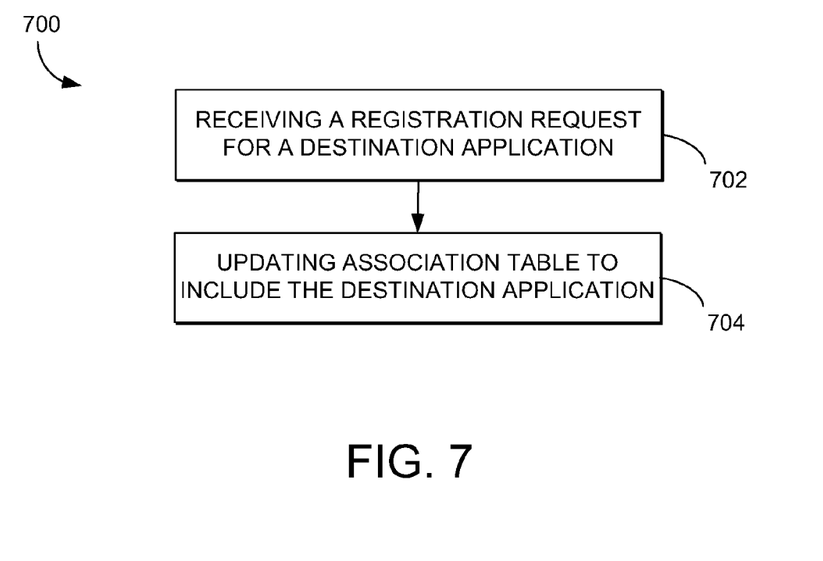
FIG. 7 is a flow diagram illustrating an exemplary method for dynamically updating an association table for use with URL application initialization, in accordance with an embodiment of the present invention.

Turning now to FIG. 7, a flow diagram illustrating an exemplary method for dynamically updating an association table for use with URL application initialization, in accordance with an embodiment of the present invention, is illustrated and designated generally as reference numeral 700. As previously discussed, in various embodiments of the present invention, the association table is dynamically configurable, allowing URL application initialization for new destination applications registered after the user purchases the mobile device. Thus, as illustrated at block 702, a registration request for a destination application is received. In embodiments the destination application is unregistered and the registration request includes one or more associations between the destination application and an application identification portion of one or more URL requests. As previously discussed, the association between destination applications and URL requests may not be a one-to-one ratio because one destination application may be associated with various URL requests. Next, as indicated at block 704, the association table is updated to include the one or more associations between the destination application and the application identification portions of the one or more URL requests. In embodiments, the association table is used to initialize the destination application on the mobile device upon receipt by the mobile device from a background application of one of the one or more URL requests associated with the destination application. Further, in embodiments, as previously discussed, the destination application is initialized on the mobile device by parsing the one of the one or more URL requests to obtain an extracted application identification portion and by comparing the extracted application identification portion to one or more application identification portions in the association table and, upon determining a matching application identification portion, initializing the destination application associated with the matching application identification portion.

In the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. One or more nontransitory computer-readable media having computer-executable instructions embodied thereon that, when executed, perform a method for initializing a mobile device application ("mobile application") that resides on a mobile device based upon a received uniform resource locator ("URL") request that is associated with the mobile application, the method comprising:

at the mobile device, receiving a URL request from a wireless application protocol ("WAP") browser on the mobile device, wherein the URL request indicates an address of a website entered by a user of the mobile device to which the user of the mobile device requests the mobile device redirect, and wherein the URL request further includes an application identification portion associated with a mobile application that is associated with the website address, wherein the association between the application identification portion and the mobile application is indicated by a dynamically configurable association table, and wherein the mobile application accesses an online functionality at the website;

at the mobile device, parsing the URL request to obtain the application identification portion, wherein the application identification portion is at least a part of the URL request;

at the mobile device, accessing the association table that lists mobile applications installed on the mobile device,
A) wherein the association table associates the mobile applications with respective application identification portions corresponding to URL requests,
B) wherein each of the mobile applications is configured to access online functionality at a website identified in the corresponding URL request, and
C) wherein the association table is dynamically updated upon registration of a new mobile application on the mobile device to include an association between the new mobile application and a respective application identification portion corresponding to a URL request;

at the mobile device, prior to initializing the mobile application that is configured to access the online functionality, determining from the association table that the application identification portion is associated with the mobile application that resides on the mobile device, wherein the mobile application is not a browser, and wherein the mobile application is configured to access the online functionality at the website;

based on the determination that the application identification portion is associated with the mobile application that resides on the mobile device, initializing the mobile application that resides on the mobile device and that is configured to access the online functionality.

2. The nontransitory computer-readable media of claim 1, wherein the application identification portion includes an identification of a subdirectory, and wherein the subdirectory identification is used to initialize a specific feature of the mobile application.

3. One or more nontransitory computer-readable media having computer-executable instructions embodied thereon that, when executed, perform a method for initializing an uninstalled mobile device application ("mobile application") on a mobile device upon receiving a uniform resource locator ("URL") request that is associated with the mobile application, the method comprising:

at the mobile device, receiving a URL request from a background application on the mobile device, wherein the URL request indicates a web address of a website to which a user of the mobile device requests the mobile device redirect, and wherein the web address in the URL request further includes an application identification portion that is associated with the uninstalled mobile application, wherein the uninstalled mobile application is not a browser;

at the mobile device, parsing the URL request to obtain the application identification portion, wherein the application identification portion is at least a part of the URL request;

at the mobile device, determining that there is an association between the application identification portion and the uninstalled mobile application that is configured to access an online functionality associated with a website associated with the URL request,
A) wherein the association between the application identification portion and the uninstalled mobile application is determined by accessing an association table that lists mobile applications installed on the mobile device and that associates each of the mobile applications with respective application identification portions corresponding to URL requests, B) wherein each of the mobile applications is configured to access online functionality at a website identified in the corresponding URL request, and C) wherein the association table is dynamically updated upon registration of a new mobile application on the mobile device to include an association between the new mobile application and a respective application identification portions corresponding to a URL request;

at the mobile device, determining that the uninstalled mobile application is uninstalled on the mobile device; and at the mobile device, upon determining that the uninstalled mobile application associated with the application identification portion is uninstalled on the mobile device, then in response to the URL request, redirecting the mobile device to an application download website that allows the user of the mobile device to download the uninstalled mobile application.

4. The nontransitory computer-readable media of claim 3, further comprising:

downloading the uninstalled mobile application; and initializing the uninstalled mobile application.

5. The nontransitory computer-readable media of claim 4, wherein the background application is a WAP browser.

6. The nontransitory computer-readable media of claim 4, wherein the background application is a short message service ("SMS") application.

7. The nontransitory computer-readable media of claim 3, wherein the application identification portion includes an identification of a subdirectory, and wherein the subdirectory identification is used to initialize a specific feature of the uninstalled mobile application.

8. One or more nontransitory computer-readable media having computer-executable instructions embodied thereon that, when executed, perform a method for dynamically updating an association table that associates an application for a mobile device ("mobile application") to a uniform resource locator ("URL") request, the method comprising:

at the mobile device, receiving a registration request for an unregistered mobile application, A) wherein the mobile application is not a browser, B) wherein the mobile application is configured to access an online functionality at a web site, C) wherein the registration request includes an association between the mobile application and an application identification portion of the URL request, wherein the application identification portion is included in a web address of the website within the URL request, and D) wherein the application identification portion included in the web address identifies the online functionality that is accessible at the web address of the website via the mobile application; and at the mobile device, updating the association table that resides on the mobile device and that lists mobile applications installed on the mobile device to include the association between the mobile application and the application identification portion of the URL request, A) wherein the association table associates the mobile applications with respective application identification portions corresponding to URL requests, B) wherein each of the mobile applications is configured to access online functionality at a website identified in the corresponding URL request, C) wherein the association table is dynamically updated in response to the registration request to include the association between the mobile application and the application identification portion of the URL request, and D) wherein the association table is used to initialize the mobile application on the mobile device upon receipt by the mobile device, from a background application on the mobile device, of the URL request that includes the application identification portion that identifies the online functionality that is accessible at the address of the web site.

9. The nontransitory computer-readable media of claim 8, wherein the mobile application is initialized on the mobile device by parsing the one of the one or more URL requests to obtain an extracted application identification portion and by comparing the extracted application identification portion to one or more application identification portions in the association table and, upon determining a matching application identification portion, initializing the mobile application associated with the matching application identification portion.

10. The nontransitory computer-readable media of claim 9, wherein the background application is a WAP browser.

11. The nontransitory computer-readable media of claim 9, wherein the application identification portion includes an identification of a subdirectory, and wherein the subdirectory identification is used to initialize a specific feature of the mobile application.

* * * * *